United States Patent
Shirey et al.

(10) Patent No.: US 8,762,236 B1
(45) Date of Patent: Jun. 24, 2014

(54) SYSTEM AND APPARATUS FOR TRANSACTION DATA FORMAT AND FUNCTION VERIFICATION

(75) Inventors: John Earl Shirey, Atkinson, NH (US); James Harrison Bullard, Tampa, FL (US); Joseph Stumpf Dollard, Lutz, FL (US)

(73) Assignee: Paymentech, LLC, Dallas, TX (US)

( * ) Notice: Subject to any disclaimer, the term of this patent is extended or adjusted under 35 U.S.C. 154(b) by 4539 days.

(21) Appl. No.: 10/196,586

(22) Filed: Jul. 15, 2002

(51) Int. Cl.
*G06Q 40/00* (2012.01)

(52) U.S. Cl.
USPC .......... 705/35; 705/37; 705/64; 705/75; 705/76

(58) Field of Classification Search
USPC .................. 705/35, 37, 64, 75, 76
See application file for complete search history.

(56) References Cited

U.S. PATENT DOCUMENTS

| | | | | |
|---|---|---|---|---|
| 3,786,439 A * | 1/1974 | McDonald et al. | ........... | 714/702 |
| 5,621,670 A * | 4/1997 | Maeda et al. | ........... | 703/21 |
| 5,956,700 A * | 9/1999 | Landry | ........... | 705/40 |
| 7,096,363 B2 * | 8/2006 | Kon et al. | ........... | 713/176 |
| 2001/0001877 A1 * | 5/2001 | French et al. | ........... | 713/182 |
| 2002/0166090 A1 * | 11/2002 | Maeda et al. | ........... | 714/746 |
| 2002/0198798 A1 * | 12/2002 | Ludwig et al. | ........... | 705/35 |
| 2003/0055754 A1 * | 3/2003 | Sullivan | ........... | 705/31 |
| 2004/0078328 A1 * | 4/2004 | Talbert et al. | ........... | 705/40 |

\* cited by examiner

*Primary Examiner* — Muriel Tinkler (74) *Attorney, Agent, or Firm* — Jackson Walker L.L.P.; Christopher J. Rourk (57) ABSTRACT

A system for processing transaction data is provided. The system includes a transaction data format system receiving transaction data and generating transaction data format error data, such as when the transaction data is not in compliance with a transaction data format. The system also includes a transaction data rules system receiving the transaction data and generating transaction rule error data, such as when the transaction data is in the proper format but nevertheless violates a rule of one or more financial processing system.

15 Claims, 3 Drawing Sheets

SYSTEM AND APPARATUS FOR TRANSACTION DATA FORMAT AND FUNCTION VERIFICATION

FIELD OF THE INVENTION

The present invention pertains to the field or transaction data processing. More specifically, the invention relates to a system and apparatus for transaction data processing that specifies data formats related to functions performed for different financial processing entities.

BACKGROUND

Transaction processing systems are known in the art. Such transaction processing systems receive transaction data from merchants and assemble the data for transmission to financial processing systems, such as banks or credit card issuing organizations. These transaction processing systems receive data from the merchant in the format dictated by the financial processing system, and forward the transaction data on for subsequent processing in large files known as "batch files." These batch files are usually submitted once every day, or at other periodic times.

While such transaction processing systems perform certain useful functions, the merchant must ensure that the data that has been entered is in the proper format and falls within allowable boundaries for each financial processing system. Each financial processing system has specialized data formats and functions, which further complicates the processing of transaction data. When a merchant has failed to provide data in the proper format or within allowable boundaries, the financial processing system generates an error message that is then transmitted in a batch file to the merchant through the transaction processing system. Thus, the process of correcting the data can take several days, which can be further complicated if personnel are entering incorrect data fields and are unaware of that condition until the error messages are received and processed.

SUMMARY OF THE INVENTION

In accordance with the present invention, a system and apparatus for processing transaction data are provided that overcome known problems with processing transaction data.

In particular, a system and apparatus for processing transaction data are provided that check the transaction data to determine whether it is in a proper format for one of two or more financial processing systems, and that further check the transaction data to ensure that it complies with one or more rules of two or more financial processing systems.

In accordance with an exemplary embodiment of the present invention, a system for processing transaction data for two or more financial processing systems is provided. The system includes a transaction data format system receiving transaction data and generating transaction data format error data, such as when the transaction data is nor in compliance with the transaction data format for the selected financial processing system. The system also includes a transaction data rules system receiving the transaction data and generating transaction rule error data, such as when the transaction data is in the proper format but nevertheless violates a rule of one or more financial processing system.

The present invention provides many important technical advantages. One important technical advantage of the present invention is a system and apparatus for processing transaction data that determines whether a format error or rules error has been committed by a merchant that has submitted the transaction data for two or more financial processing systems. The present invention thus ensures that the data provided to each financial processing system not only is in the proper format, but also meets any functional requirements.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description which follows, like parts are marked throughout the specification and drawings with the same reference numerals, respectively. The drawing figures may not be to scale and certain components can be shown in generalized or schematic form and identified by commercial designations in the interest of clarity and conciseness.

Figure 1:
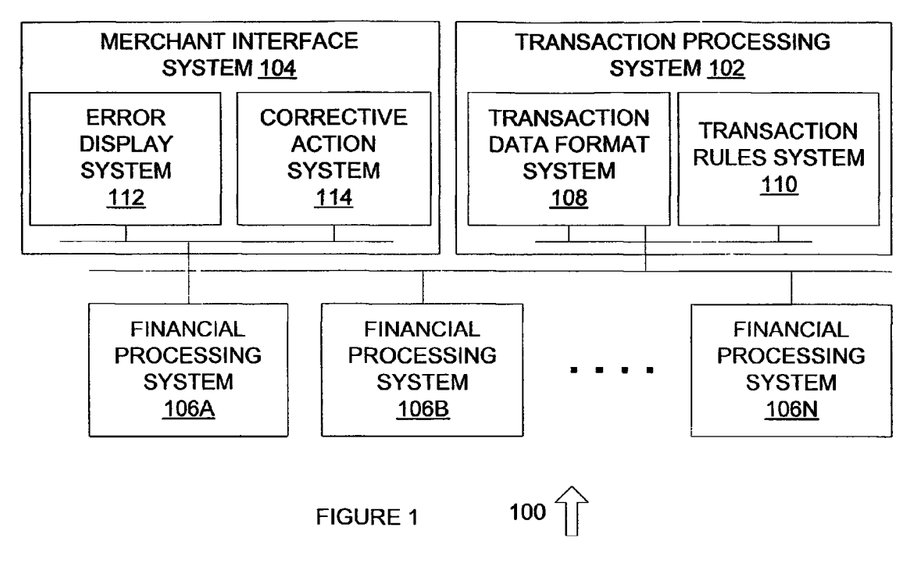
FIG. 1 is a diagram of a system for processing transaction data in accordance with an exemplary embodiment of the present invention.

FIG. 1 is a diagram of a system 100 for processing transaction data in accordance with an exemplary embodiment of the present invention. System 100 allows transactions such as credit card transactions, debit card transactions, or other suitable transactions to be processed through a centralized system, such that merchants can readily interface with a number of different financial processing systems.

System 100 includes transaction processing system 102 and merchant interface system 104, which can be implemented in hardware, software, or a suitable combination of hardware and software, and which can be one or more hardware systems, or one or more software systems operating on a general purpose processing platform. As used herein, a hardware system can include discrete semiconductor devices, an application-specific integrated circuit, a field programmable gate array or other suitable devices. A software system can include one or more objects, agents, threads, lines of code, subroutines, separate software applications, user-readable (source) code, machine-readable (object) code, two or more lines of code in two or more corresponding software applications, databases, or other suitable software architectures. In one exemplary embodiment, a software system can include one or more lines of code in a general purpose software application, such as an operating system, and one or more lines of software in a specific purpose software application.

Transaction processing system 102 is coupled to merchant interface system 104 and financial processing systems 106A through 106N over communications medium 116. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. In one exemplary embodiment, systems and components are coupled to other systems and components through intervening systems and components, such as through an operating system. Communications medium 116 can be a local area network, a wide area network, a public network such as the Internet, the public switched telephone network, a wireless network, a fiber optic network, other suitable media, or a suitable combination of such media.

Transaction processing system 102 receives transaction data from merchant interface system 104 and provides the transaction data to the proper financial processing system 106A through 106N. In addition, transaction processing system 102 determines whether the data format requirements of the associated financial processing system 106A through 106N have been satisfied. Transaction processing system 102 also performs a rules check on the transaction data, such as to determine whether the rules of the proper financial processing system 106A through 106N have been complied with.

In general, when a merchant submits transaction data for processing by a financial processing system, the merchant must comply with the financial processing system's data format requirements and rules. For example, the financial processing system may have a data format that must be followed by each merchant. Likewise, each financial processing system will have rules regarding how transaction data can be submitted, what must be done in circumstances to respond to a request for authorization or settlement process, and other suitable rules. For example, the rules for processing a credit card transaction are different from the rules for processing a debit card transaction. Transaction processing system 102 can utilize a standardized format, such as an extensible markup language (XML) data type definition (DTD) that allows the data received from merchant interface system 104 to be standardized, and which further allows transaction processing system 102 to map the data to the appropriate financial processing system 106A through 106N data format. In this manner, transaction processing system 102 eliminates the need for operators of merchant interface system 104 to gather and format data in different formats based on the financial processing system 106A through 106N that the transaction data is being transmitted to. Likewise, transaction processing system 102 can verify that the rules of the associated financial processing system 106A through 106N have been complied with, and can immediately request the merchant or operator of merchant interface system 104 to correct any problems with a data format error or a transaction rule error, rather than requiring such errors to be identified only after processing by the financial processing system 106A through 106N, which can cause delay and add expense to the processing of the transaction.

Transaction processing system 102 includes transaction data format system 108 and transaction rules system 110, each of which can be implemented in hardware, software, or a suitable combination of hardware and software, and which can be one or more software systems operating on a general purpose processing platform. Transaction data format system 108 provides transaction data format data to merchant interface system 104, and determines whether the data provided in response complies with the applicable transaction data format. In one exemplary embodiment, transaction data format system 108 can include an XML DTD or other suitable data definitions that can be used by an operator of merchant interface system 104 to design an interface for transaction processing system 102. A suitable group of two or more of the fields can be identified as mandatory fields, so as to prevent the data from being used by unauthorized parties, to perform fraud monitoring, to perform quality control, or for other suitable purposes. An exemplary embodiment of such as XML DTD is shown in TABLE 1 below:

TABLE 1

| LABEL | MAX. LENGTH | DESCRIPTION |
| --- | --- | --- |
| AC | N/A | Required XML Parent Tag. |
| AccountNum | 19 | Card Number identifying the customer. |
| AccountTypeInd | 2 | Defines Account type. |
| AdjustedAmt | 12 | Amount for Partial Voids if necessary. |
| Amount | 12 | Transaction Amount. |
| AmountDetails | N/A | XML Parent Tag for defining the Transaction amount details. |
| AttendedTermData Ind | 2 | Indicates if the card acceptor was at the point of sale. |
| Auth | N/A | XML Parent Tag. |
| AuthCharInd | 1 | Code issued by Card Issuer for CPS evaluation |
| AuthCd | 6 | Prior Authorization Code. |
| AuthCode | 6 | Issuer approval Code delivered in response. |
| AuthID | 6 | Populated for incremental and reversal authorizations. |
| AuthMandatory | N/A | Required XML Parent Tag. |
| AuthNetwkId | 2 | Code indicating network that processed the transaction. |
| AuthOptional | N/A | Required XML Parent Tag. |
| AuthSrc | 1 | Code indicating how authorization was performed. |
| AVSaddress1 | 30 | Cardholder Billing Address line 1. |
| AVSaddress2 | 30 | Cardholder Billing Address Line 2. |
| AVSbase | N/A | Identifies that Address Verification (AVS) data will be submitted for a Recurring Transaction. |
| AVScity | 20 | Cardholder Billing City. |
| AVSextended | N/A | XML Parent Tag for eCommerce address verification request. |
| AVSname | 30 | Cardholder/Checkholder Billing Name. |
| AVSRespCd | 2 | Address verification request response. |

TABLE 1-continued

| LABEL | MAX. LENGTH | DESCRIPTION |
|---|---|---|
| AVSstate | 2 | Cardholder Billing State. |
| AVSzip | 10 | Cardholder Billing Address Zip Code. |
| BankAccountType | 1 | Defines the deposit account type. |
| BankCheck | N/A | Electronic Check (ECP) XML Parent Tag for all associated elements and attributes of the card type. |
| BankNetDate | 4 | Generated response date. |
| BankNetRefNo | 9 | Generated identifier for each original auth request. |
| BankPmtDelv | 1 | Defines the ECP delivery method. |
| Batch | N/A | XML tag that defines the transaction as a batch [EOD] request. |
| BatchResponse | N/A | XML tag that defines the transaction as a batch [EOD] response. |
| BCR†Num | 9 | Bank routing and transit number for the customer. For Electronic Check processing. |
| BIN | 6 | Transaction Routing Definition. |
| Cap | N/A | Required XML Parent Tag. |
| CapMandatory | N/A | Required XML Parent Tag. |
| CapOptional | N/A | Required XML Parent Tag. |
| CaptureStatus | 1 | Status of Capture Request. |
| CardBrand | 2 | Defines the Card Type/Brand for the Transaction. |
| CardholderAttendanceInd | 2 | Indicates if the cardholder was present at the POS. |
| CardIssueNo | 2 | European Debit Card. |
| CardNP | N/A | XML Parent Tag which defines the transaction as Card not present and the associated data elements that can be submitted as a result. |
| CardPresence | N/A | XML Parent Tag in which child elements are card present or card not present. |
| CardPresentInd | 1 | Indicates if the card was present at the POS. |
| CardSecVal | 4 | CVV2 number. |
| CardStartDate | 4 | European Debit Card (Switch Record Format Only). |
| CardType | N/A | XML Parent tag which defines the Card Type and Brand. |
| CATInfoInd | 2 | Indicates type of Cardholder Activated Terminal (CAT). |
| CheckDDA | 17 | Customer DDA account number For Electronic Check processing. |
| Comments | 64 | Free form comments. |
| CommonData | N/A | Required XML Parent Tag. |
| CommonMandatory | N/A | Required XML Parent Tag. |
| CommonMandatoryResponse | N/A | XML tag sent in an authorizations, Auth-Captures, and Mark for Capture response. |
| CommonOptional | N/A | XML Parent Tag. |
| Currency | N/A | XML Parent Tag which can include Currency data attributes. |
| CurrencyCode | 3 | Defines the transaction currency. |
| CurrencyExponent | 6 | Defines the transactions currency exponent. |
| CVV2RespCd | 1 | Card verification value request response. |
| DebitCard | N/A | Switch - Solo XML Parent Tag for all associated elements and attributes of the card type. |
| DebitCardIssueNum | 2 | Switcn Solo incremental counter for Lost or replacement cards. |
| DebitCardStartDate | 4 | Switch - Solo cards activation date. |
| DownGradeReason | 2 | Interchange Downgrade Reason Code. |
| EcommerceData | N/A | XML Parent Tag that defines the transaction as a single purchase eCommerce transaction and the required data elements and attributes of that transaction type. |
| ECOrderNum | 16 | Merchant Defined Order Number. |
| ECSecurityInd | 2 | Defines Electronic Commerce security. |
| EntryDataSrc | 2 | Indicates how primary Account number originally entered. |
| ErrBitNo | 3 | Internal message mapping error location for this transaction. |
| ErrSubtagVal | 2 | Internal message mapping error location for this transaction. |
| Exp | 4 | Card Expiration Date. |
| FormatInd | 1 | Determines format of additional data submitted in the subsequent XML Tag <AuthOptional> hierarchy, such as Home AVS with Telephone format data included, Work AVS with Telephone format data included, Electronic Check format data Included, European debit Card Switch (Switch Card format data included). |

TABLE 1-continued

| LABEL | MAX. LENGTH | DESCRIPTION |
|---|---|---|
| HcsTcsInd | 1 | Constant 'T'. |
| HostAVSRespCd | 2 | Actual host address verification response code. |
| HostCVV2RespCd | 1 | Actual host address verification response code. |
| HostRespCd | 3 | Actual host response code. |
| LangInd | 2 | Language Indicator. |
| MailOrderData | N/A | XML Parent Tag that defines the transaction as a recurring purchase and the required data elements and attributes of that transaction type. |
| MailOrderNum | 9 | Merchant Defined Order Number. |
| MailOrderTypeInd | 1 | Mail order indicator to describe the type of transaction. |
| MCInterchangeInd | 1 | Interchange Compliance Data. |
| MCPurchCardInd | 1 | Business Card Type Indicator. |
| MerchantID | 15 | Gateway merchant account number. |
| MerchantSIC | 4 | Merchant's Standard Industry Code (a.k.a MCC). |
| MessageType | 4 | Defines Message Type, such as authorization request, authorization and mark for capture, capture, void, refund, and batch release. |
| OrderID | 16 | Merchant Defined Order Number. |
| OrigAuthAmt | 12 | Identifies the original amount authorized in Mark for Capture responses. |
| OutstandingAmt | 12 | Remaining Non-voided amount for partial Voids. |
| PCCore | N/A | XML Parent Tag for 2 of 4 Purchasing Card II Data Elements. |
| POSCardID | 1 | Defines cardholder location. |
| POSConditionCode | 2 | Code that defines the POS environment. |
| POSEntryMode | 2 | Code that defines the method to process cardholder account. |
| POSValidCode | 1 | MC POS Entry Mode Validation Response. |
| PriorAuthID | N/A | Defines the transaction type as a Prior Auth. |
| ProcStatus | 6 | Process Status. |
| PCDestZip | 10 | Shipping Destination Zip code for the purchase. |
| PCOrderNum | 17 | PO number or Order number from customer. |
| QuickResponse | N/A | XML tag that defines the transaction as an Quick Response which is an error condition. |
| Refund | N/A | XML tag that defines the transaction as a Refund request. |
| RefundResponse | N/A | XML tag that defines the response as a Refund Response. |
| Request | N/A | XML Parent Tag. |
| RespCode | 2 | Response Code. |
| RespDate | 6 | The date a response was generated by the Gateway. |
| RespMessage | 80 | Messages associated with RespCode. |
| RespTime | 14 | Date/time transaction was processed by gateway. |
| ResponseCodes | N/A | XML tag in which all host response elements are delivered. |
| ShippingRef | 40 | Shipping Tracking Reference Number. |
| StatusMsg | Var | Text message associated with ProcStatus value. |
| StatusMsgLth | 4 | Length of StatusMessage. |
| Tax | 12 | Tax Amount for the purchase. |
| TaxInd | 1 | Defines the tax amount |
| TermEntCapInd | 2 | Code that defines the method to process cardholder account. |
| TerminalID | 3 | Merchant Terminal ID. |
| TermLocInd | 2 | Indicates terminal location. |
| TotAuthAmt | 12 | This is the net amount for all authorizations for this transaction. |
| TransErrNo | 5 | Internal error number for this transaction. |
| TransID | 15 | Identifier for each original auth request. |
| TxCatg | 1 | Defines transaction type. |
| TxRefIdx | 4 | Gateway transaction index. |
| TxRefNum | 40 | Gateway transaction reference number. |
| TzCode | 3 | Time zone for Merchant. |
| TxDateTime | 14 | Transaction date and Time. |
| TxTypeCommon | N/A | Required XML Parent Tag for TxTypeId and PriorAuthID |
| TxTypeID | 2 | Defines the transaction type: G - Goods & services |
| ValidationCd | 4 | Validation code supplied for CPS qualification |
| Version | 1 | Constant '2' |
| VisaCommCard | 1 | Indicates commercial card. |
| Void | N/A | XML tag that defines the transaction as a Void request. |
| VoidResponse | N/A | XML tag that defines the transaction as a Void response. |

Likewise, the merchant interface system 104 can be implemented using a web browser, such that transaction processing system 102 transmits the required transaction processing forms for web transactions, card not present transactions, interfacing with a point of sale device, or other suitable forms.

Transaction rules system 110 implements transaction processing rules imposed by card organizations, financial processing systems, transaction processing system 102, or other suitable rules. In one exemplary embodiment, the data entered in response to a form specified by transaction data format system 108 may meet all formal requirements, but may be outside of boundaries allowed under a transaction rules system. Transaction rules system 110 tests the data entered to determine whether it complies with the transaction rules.

Merchant interface system 104 includes error display system 112 and corrective action system 114, each of which can be implemented in hardware, software, or a suitable combination of hardware and software, and which can be one or more software systems operating on a general purpose processing platform. Error display system 112 receives error data from transaction processing system 102 and generates an error message or notification. In one exemplary embodiment, error display system 112 can be XML data, HTML data, or other suitable data transmitted by transaction processing system 102 that generates a screen on a web browsing system of merchant interface system 104, or other suitable processes can be used. Error display system 112 notifies the user of the transaction data format or transaction rule that has been violated, identifies the data that violated the transaction data format or transaction rule, and performs other suitable functions.

Corrective action system 114 receives correction data from a user and provides the correction data to transaction processing system 102 in response to a transaction data format error or a transaction rule error. In one exemplary embodiment, corrective action system 114 includes an error explanation field that provides explanatory data for the user that describes the data should be entered, the problem with the data that was entered, or other suitable data, a data entry field that allows the user to replace only the defective entry field, and can further allow a user to replace additional data entry fields where suitable if such data entry fields are related to the error field.

In operation, a user of merchant interface system 104 provides transaction data to transaction processing system 102. The transaction data can be provided by interfacing with a web server that receives data from other users and which combines such other user data with data from merchant interface system 104, such as transaction identifier data, customer identifier data, merchandise data, or other suitable data. The transaction data is then transmitted to transaction processing system 102, where it is determined whether all the transaction data is in a proper transaction data format through transaction data format system 108, and where it is further determined whether transaction rules have been followed for the respective financial processing system. If it is determined that a transaction data format error has been included in the transaction data, transaction processing system 102 and transaction data format system 108 transmit error data to merchant interface system 104 and error display system 112, including but not limited to an identification of the data field that is in error, what the data field stands for, what the error relates to, or other suitable data. Likewise, transaction processing system 102 and transaction data format system 108 can provide data to corrective action system 114 to prompt the user to replace the defective data with corrected data. Likewise, merchant interface system 104 can include error display system 112 and corrective action system 114, such that transaction codes only are sent by transaction data format system 108 and transaction rules system 110.

After the transaction data format has been verified, transaction rules system 110 determines whether the data values entered are within allowable data ranges. Likewise, transaction rules system 110 determines whether the data values entered relate to other data values in an allowable manner. For example, providing a charge for a transaction on a date that occurs in the future might not be permitted under financial processing system rules. Likewise, other suitable rules can be implemented by transaction rules system 110. If a transaction rule error has occurred, error display system 112 can notify the user of the transaction rule error, and corrective action system 114 can request the user to enter corrected data. After the transaction data format and transaction rules have been satisfied, transaction processing system 102 transmits the transaction data to the appropriate financial processing system 106A through 106N, such as by first mapping the data into an appropriate financial processing system data format. Transaction processing system 102 also receives response data from the financial processing systems 106A through 106N, and can further map the response data from the financial processing system data format to an appropriate format, and can transmit that data to merchant interface system 104 for additional processing, corrective actions, or other suitable processes.

Figure 2:
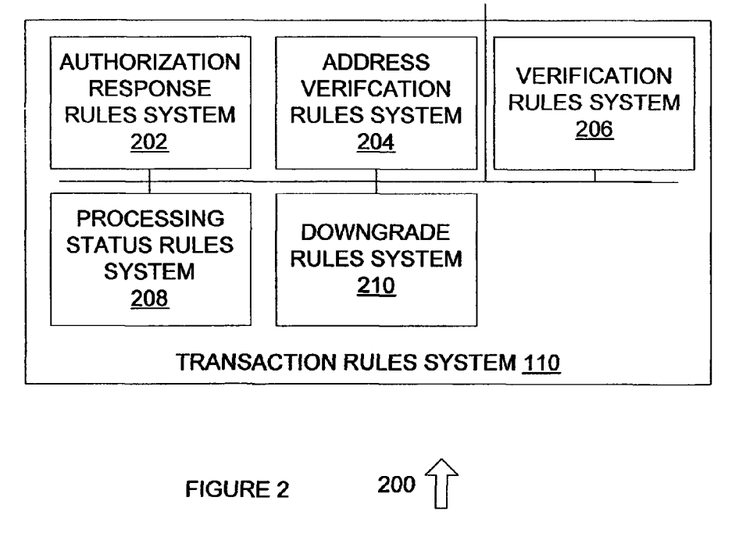
FIG. 2 is a diagram of a system for providing transaction rules processing in accordance with an exemplary embodiment of the present invention.

FIG. 2 is a diagram of a system 200 for providing transaction rules processing in accordance with an exemplary embodiment of the present invention. System 200 includes transaction rules system 110 and authorization response rules system 202, address verification rules system 204, card verification value rules system 206, processing status rules system 208, and downgrade rules system 210, each of which can be implemented in hardware, software, or a suitable combination of hardware and software, in which can be one or more software systems operating on a general purpose processing platform.

Authorization response rules system 202 receives transaction data and generates authorization response rules error data. In one exemplary embodiment, the authorization response rules system 202 can determine whether a transaction has been authorized, whether fraud indicators exist, whether an account number or PIN number is invalid, or other suitable functions. For example, the exemplary authorization response rules shown in TABLE 2 and TABLE 3 can be implemented by authorization response rules system 202:

TABLE 2

| ACTION | DESCRIPTION |
|---|---|
| Call Cust. | Call Customer Service for assistance. |
| | Try to resolve with customer or obtain alternate payment method. |
| Fix | There is an invalid value being sent. Fix and resend. |
| Send | Send this transaction back at any time. |
| Voice | Perform a voice authorization per instructions. |
| Wait | Wait 2-3 days before resending or try to resolve with customer. |

TABLE 3

| CODE | RULE | STATUS | ACTION |
|---|---|---|---|
| 0 | Approved | Approved | None |
| 1 | Call/Refer to Card Issuer | Decline | Voice |

TABLE 3-continued

| CODE | RULE | STATUS | ACTION |
|---|---|---|---|
| 2 | Refer to Card issuer's special conditions | Decline | Voice |
| 3 | Invalid Merchant Number | Error | Fix |
| 4 | Pickup | Decline | Cust. |
| 5 | Do Not Honor | Decline | Cust. |
| 6 | Other Error | Decline | Cust. |
| 8 | Approved authorization, honor with identification | Approved | None |
| 10 | Default Call | Decline | Voice |
| 11 | Approved authorization, VIP Approval | Approved | None |
| 12 | Invalid Transaction Type | Decline | Cust. |
| 13 | Bad Amount | Decline | Fix |
| 14 | Invalid Credit Card Number | Decline | Fix |
| 15 | Default Call Low Fraud | Decline | Voice |
| 16 | Default Call Medium Fraud | Decline | Voice |
| 17 | Default Call High Fraud | Decline | Voice |
| 18 | Default Call Unavailable Fraud | Decline | Voice |
| 19 | Re-enter Transaction | Error | Resend |
| 20 | Floor Low Fraud | Decline | Cust. |
| 21 | Floor Medium Fraud | Decline | Cust. |
| 22 | Floor High Fraud | Decline | Cust. |
| 23 | Floor Unavailable Fraud | Decline | Cust. |
| 24 | Validated | Approved | None |
| 25 | Verified | Approved | None |
| 26 | Prenoted | Approved | None |
| 27 | No reason to decline | Decline | Cust. |
| 28 | Received and stored | Approved | None |
| 29 | Provided Auth | Approved | None |
| 30 | Invalid value in message | Error | Fix |
| 31 | Request received | Approved | None |
| 32 | BIN Alert | Approved | None |
| 33 | Card is expired | Decline | Cust. |
| 34 | Approved for partial | Approved | None |
| 35 | Zero Amount | Error | Fix |
| 36 | Bad Total Auth amount | Error | Fix |
| 40 | Requested Function not supported | Error | Call or Fix |
| 41 | Lost/Stolen | Decline | Cust. |
| 43 | Lost/Stolen Card | Decline | Cust. |
| 50 | Positive ID | Decline | Cust. |
| 52 | Processor Decline | Decline | Cust. |
| 56 | Restraint | Decline | Cust. |
| 58 | Transaction not permitted to terminal | Error | Call |
| 59 | Soft AVS | Decline | Cust. |
| 60 | Do Not Honor Low Fraud | Decline | Cust. |
| 61 | Do Not Honor Medium Fraud | Decline | Cust. |
| 62 | Do Not Honor High Fraud | Decline | Cust. |
| 63 | Do Not Honor Unavailable Fraud | Decline | Cust. |
| 64 | CVV2/CVC2 Failure | Decline | Cust. |
| 65 | Invalid CID | Decline | Cust. |
| 66 | Other Error | Error | Fix |
| 68 | Invalid CC Number | Error | Fix |
| 69 | Does not match MOP | Error | Fix |
| 71 | No Account | Decline | Fix |
| 72 | Invalid Institution Code | Decline | Fix |
| 73 | Method of Payment is Invalid for Merchant | Error | Fix |
| 74 | Invalid Expiration Date | Decline | Cust. |
| 75 | Bad Amount | Error | Fix |
| 77 | Invalid Amount | Decline | Fix |
| 78 | Missing Companion Data | Error | Fix |
| 79 | Invalid Merchant | Error | Fix |
| 80 | Invalid MOP for division | Error | Fix |
| 81 | Call Low Fraud | Decline | Voice |
| 82 | Call Medium Fraud | Decline | Voice |
| 83 | Call High Fraud | Decline | Voice |
| 84 | Call Unavailable Fraud | Decline | Voice |
| 85 | Duplicated Order # | Error | Fix |
| 86 | Auth Recycle Host down | Error | Wait |
| 87 | Invalid Currency | Error | Fix |
| 88 | Invalid Purch. Level III | Error | Fix |
| 89 | Credit Floor | Decline | Cust. |
| 91 | Approved Low Fraud | Approved | None |
| 92 | Approved Medium Fraud | Approved | None |
| 93 | Approved High Fraud | Approved | None |
| 94 | Approved Fraud Service Unavailable | Approved | None |
| 95 | Invalid Data Type | Error | Fix |
| 96 | Invalid Record Sequence | Error | Fix |
| 97 | Percents Not Total 100 | Error | Fix |
| 98 | Issuer Unavailable | Decline | Resend |
| 99 | No Answer/Unable to send | Error | Resend |
| A1 | Payments Not total Order | Error | Fix |
| A2 | Bad Order Number | Error | Fix |
| A3 | FPO Locked | Error | Call |
| A4 | FPO Now Allowed | Error | Call |
| A5 | Auth Amount Wrong | Error | Fix |
| A6 | Illegal Action | Error | Fix |
| A8 | Invalid Start Date | Error | Fix |
| A9 | Invalid Issue Number | Error | Fix |
| B1 | Invalid Transaction Type | Error | Fix |
| B5 | Not on file | Decline | Fix |
| B7 | Fraud | Decline | Cust. |
| B8 | Bad Debt | Decline | Cust. |
| B9 | On Negative File | Decline | Cust. |
| C1 | Invalid Issuer | Decline | Cust. |
| C2 | Invalid Response Code | Decline | Fix |
| C3 | Excessive PIN Try | Decline | Cust. |
| C4 | Over Limit | Decline | Cust. |
| C5 | Over Freq Limit | Decline | Cust. |
| C6 | Over Sav Limit | Decline | Cust. |
| C7 | Over Sav Freq | Decline | Cust. |
| C8 | Over Credit Limit | Decline | Cust. |
| C9 | Over Credit Freq | Decline | Cust. |
| D1 | Invalid For Credit | Decline | Fix |
| D2 | Invalid For Debit | Decline | Fix |
| D3 | Rev Exceed Witndrawal | Decline | Cust. |
| D4 | One Purchasing Limit | Decline | Cust. |
| D5 | On Negative File | Decline | Cust. |
| D6 | Changed Field | Decline | Fix |
| D7 | Insufficient Funds | Decline | Cust. |
| D8 | Encrypted Data Bad | Decline | Fix |
| D9 | Altered Data | Decline | Fix |
| E3 | Invalid Prefix | Decline | Fix |
| E4 | Invalid Institution | Decline | Fix |
| E5 | Invalid Cardholder | Decline | Fix |
| E6 | BIN Block | Decline | Fax |
| E7 | Stored | Approved | None |
| E8 | Invalid Transit Routing Number | Error | Fax |
| E9 | Unknown Transit Routing Number | Error | Fix |
| F1 | Missing Name | Error | Fix |
| F2 | Invalid Account Type | Error | Fix |
| F3 | Account Closed | Error | Cust. |
| F4 | No Account/Unable To Locate | Error | Fix |
| F5 | Account holder Decreased | Error | Cust. |
| F6 | Beneficiary Decreased | Error | Cust. |
| F7 | Account Frozen | Error | Cust. |
| F8 | Customer Opt Out | Error | Cust. |
| F9 | ACH Non-Participant | Error | Cust. |
| G1 | No Pre-note | Error | Fix |
| G2 | No Address | Error | Fix |
| G3 | Invalid Account Number | Error | Fax |
| G4 | Authorization Revoked by Consumer | Error | Cust. |
| G5 | Customer Advises Not Authorized | Error | Cust. |
| G6 | Invalid CECP Action Code | Error | Fix |
| G7 | Invalid Account Format | Error | Fix |
| G8 | Bad Account Number Data | Error | Fix |
| G9 | No Capture | Decline | N/A |
| H1 | No Credit Function | Decline | N/A |
| H2 | No Debit Function | Decline | N/A |
| H3 | Rev Exceed Withdrawal | Decline | Cust. |
| H4 | Changed Field | Decline | N/A |
| H5 | Terminal Not Owned | Decline | N/A |
| H6 | Invalid Time | Decline | Fix |
| H7 | Invalid Date | Decline | Fix |
| H8 | Invalid Terminal Number | Decline | Fix |
| H9 | Invalid PIN | Decline | Fix |
| J1 | No Manual Key | Decline | Fix |
| J2 | Not Signed In | Decline | Fix |
| J3 | Excessive PIN Try | Decline | Cust. |
| J4 | No DDA | Decline | Fix |
| J5 | No SAV | Decline | Fix |
| J6 | Excess DDA | Decline | Cust. |
| J7 | Excess DDA FREQ | Decline | Cust. |
| J8 | Excess SAV | Decline | Cust. |

TABLE 3-continued

| CODE | RULE | STATUS | ACTION |
|------|------|--------|--------|
| J9 | Excess SAV FREQ | Decline | Cust. |
| K1 | Excess Card | Decline | Cust. |
| K2 | Excess Card Freq | Decline | Cust. |
| K3 | Reserved Future | Decline | N/A |
| K4 | Reserved Closing | Decline | N/A |
| K5 | Dormant | Decline | Cust. |
| K6 | NSF | Decline | Cust. |
| K7 | Future RD Six | Decline | N/A |
| K8 | Future RD Seven | Decline | N/A |
| K9 | Transaction Code Conflict | Decline | Fix |
| L1 | In Progress | Decline | Wait |
| L2 | Process Unavailable | Error | Resend |
| L3 | Invalid Expiration | Error | Fix |
| L4 | Invalid Effective | Error | Fix |
| L5 | Invalid Issuer | Decline | Fix |
| L6 | Tran not allowed for cardholder | Decline | Cust. |
| L7 | Unable to Determine Network Routing | Error | Call |
| L8 | System Error | Error | Call |
| L9 | Database Error | Error | Call |
| M1 | Merchant Override Decline | Decline | Cust. |

Based upon the action identified in the table, authorization response rules system 202 can accept a transaction, decline a transaction, request correction of data, or perform other suitable functions. For example, based on information supplied by the merchant using transaction data format system 108 or other suitable systems, authorization response rules system can generate an authorization response as shown. For example, if there are no problems with the transaction data and the transaction is authorized, then "Code 0" would be returned indicating that the transaction was approved. If the card was identified as stolen or otherwise needing to be picked up, then "Code 4" would be generated. Depending on the type of function being performed, the data provided, and the rules of the specific financial processing system being utilized, either the transaction processing system or the financial processing system would implement the rule shown in TABLE 3. Furthermore, a suitable group of two or more rules can be defined as mandatory, such as to prevent unauthorized use of the data, for fraud protection, for quality control, or for other suitable purposes.

Address verification rules system 204 receives transaction data and generates address verification response rules error data. In one exemplary embodiment, address verification rules system 204 can determine whether an address is correct, whether fraud indicators exist, or other suitable functions. For example, the exemplary authorization response rules shown in TABLE 4 can be implemented by address verification rules system 204:

TABLE 4

| AVS RULE | CODE |
|----------|------|
| No address supplied | A |
| Bill-to address did not pass Auth Host edit checks | B |
| AVS not performed | C |
| Issuer does not participate in AVS | D |
| Edit-error - AVD data is invalid | E |
| System unavailable or time-out | F |
| Address information unavailable | G |
| Transaction Ineligible for AVS | H |
| Zip Match/Zip4 Match/Locate match | I |
| Zip Match/Zip 4 Match/Locate no match | J |
| Zip Match/Zip 4 no Match/Locate match | K |
| Zip Match/Zip 4 no Match/Locate no match | L |
| Zip No Match/Zip 4 Match/Locate match | M |
| Zip No Match/Zip 4 Match/Locate no match | N |

TABLE 4-continued

| AVS RULE | CODE |
|----------|------|
| Zip No Match/Zip 4 No Match/Locate match | O |
| No match at all | P |
| Zip Match/Locate match | Q |
| Zip Match/Locate no match | R |

Based upon the action identified in the table, address verification rules system 204 can accept a transaction, decline a transaction, request correction of data, or perform other suitable functions. For example, if there were no address supplied, then "Code A" would be returned indicating that an address is needed. If the bill-to address were improper, then "Code B" would be generated. Depending on the type of function being performed, the data provided, and the rules of the specific financial processing system being utilized, either the transaction processing system or the financial processing system would implement the rule shown in TABLE 4. Furthermore, a suitable group of two or more rules can be defined as mandatory, such as to prevent unauthorized use of the data, for fraud protection, for quality control, or for other suitable purposes.

Card verification value rules system 206 receives transaction data and generates card verification rules error data. In one exemplary embodiment, card verification value rules system 206 can determine whether a card has been verified or other suitable functions. For example, the exemplary authorization response rules shown in TABLE 5 can be implemented by card verification value rules system 206:

TABLE 5

| CVV2 RULE | CODE |
|-----------|------|
| CVV Match | A |
| CVV No match | B |
| Not processed | C |
| Should have been present | D |
| Unsupported by issuer | E |
| Invalid | F |
| Not applicable | G |

Based upon the action identified in the table, card verification value rules system 206 can indicate that there has been a card verification value match, that the transaction has not been processed, or can perform other suitable functions. For example, if there were a card verification value match such that the transaction can proceed, then "Code A" would be returned indicating that the transaction was approved. If card verification is not supported by the card issuer, then "Code E" would be generated. Depending on the type of function being performed, the data provided, and the rules of the specific financial processing system being utilized, either the transaction processing system or the financial processing system would implement the rule shown in TABLE 5.

Processing status rules system 208 receives transaction data and generates processing status rules error data. In one exemplary embodiment, processing status rules system 208 can determine whether a transaction has been authorized, whether fraud indicators exist, whether an account number or PIN number is invalid, or other suitable functions. For example, the exemplary authorization response rules shown in TABLE 6 can be implemented by processing status rules system 208.

TABLE 6

| RULE | CODE |
| --- | --- |
| PROCESS SUCCESS | A0 |
| UNKNOWN ERROR | A1 |
| NETWORK ERROR | A2 |
| DB ERROR | A3 |
| CORRUPT MESSAGE | A4 |
| BAD DATA | A5 |
| TIMEOUT | A6 |
| SET ERROR | A61 |
| AUTH RESPONSE FORMAT ERROR | A7 |
| AUTH RESPONSE CODE ERROR | A8 |
| CAPTURE RESPONSE FORMAT ERROR | A9 |
| CAPTURE RESPONSE ERROR | A10 |
| BASIC VALIDATION ERROR | A11 |
| CANT PROCESS SET MESSAGE ERROR | A12 |
| MEMORY ERROR | A13 |
| AUTH STATE ERROR | A14 |
| AUTH REV STATE ERROR | A15 |
| CAP STATE ERROR | A16 |
| CAP REV STATE ERROR | A17 |
| CRED STATE ERROR | A18 |
| CRED REB STATE ERROR | A19 |
| SALE REV AMT ERROR | A20 |
| AUTH REV AMT ERROR | A21 |
| MERCH ID MISMATCH | A22 |
| FAILED TO START CAPTURE | A23 |
| NOTHING TO CAPTURE | A24 |
| CANT OPEN BATCH | A25 |
| BATCH ALREADY OPEN ERR | A26 |
| BATCH ALREADY CLOSED ERR | A27 |
| UNKNOWN EXCEPTION ERROR | A28 |
| MEMORY EXCEPTION ERROR | A29 |
| SET MESSAGE ALREADY SENT | A30 |
| ERROR BAD CREDIT AMOUNT | A31 |
| ERROR BAD CREDIT REV AMOUNT | A32 |
| ERROR BAD CAPTURE AMOUNT | A33 |
| ERROR BAD CAPTURE REV AMOUNT | A34 |
| ERROR BAD AUTH AMOUNT | A35 |
| ERROR BAD AUTH REV AMOUNT | A36 |
| ERROR BATCH NOT OPEN | A37 |
| ERROR CANTFINDBATCH | A38 |
| BACKEND ERROR | A39 |
| NOT MOST RECENT AUTH | A40 |
| ERROR CANTADDCARDRANGE | A41 |
| ERROR CUSTOMERIDNOTFOUND | A42 |
| ERROR CUSTOMEREXISTS | A43 |
| ERROR CUSTOMERIDNOTSPECIFIED | A44 |
| ERROR NO ACQUIRER BIN | A45 |

Based upon the action identified in the table, processing status rules system 208 can accept a transaction, decline a transaction, request correction of data, or perform other suitable functions. For example, if a timeout has occurred, then "Code A6" would be returned indicating that the transaction was approved. If the customer ID were not found, then "Code A42" would be generated. Depending on the type of function being performed, the data provided, and the rules of the specific financial processing system being utilized, either the transaction processing system or the financial processing system would implement the rule shown in TABLE 6. Furthermore, a suitable group of two or more rules can be defined as mandatory, such as to prevent unauthorized use of the data, for fraud protection, for quality control, or for other suitable purposes.

Downgrade rules system 310 receives transaction data and generates downgrade rules error data. In one exemplary embodiment, downgrade rules system 310 can determine whether fraud indicators exist, whether an account number is missing, or other suitable functions. For example, the exemplary downgrade rules shown in TABLE 7 can be implemented by downgrade rules system 310.

TABLE 7

| CODE | RULE |
| --- | --- |
| A | Address verification not requested |
| B | Address verification data does not match issuer data |
| C | Invalid merchant category code for transaction |
| D | Invalid purchase identifier |
| E | Transaction not approved |
| F | Not a network card |
| G | Transaction identifier is invalid |
| H | Primary account number is missing |

Based upon the action identified in the table, downgrade rules system 210 can accept a transaction, decline a transaction, request correction of data, or perform other suitable functions. For example, if the address verification data does not match the issuer data, then "Code A" would be generated. If an invalid purchase identifier were provided, then "Code D" would be generated. Depending on the type of function being performed, the data provided, and the rules of the specific financial processing system being utilized, either the transaction processing system or the financial processing system would implement the rule shown in TABLE 7. Furthermore, a suitable group of two or more rules can be defined as mandatory, such as to prevent unauthorized use of the data, for fraud protection, for quality control, or for other suitable purposes.

In operation, system 200 allows transaction rules to be performed for processing of transaction data. System 200 allows a central gateway to perform transaction processing for a plurality of merchants so as to allow each merchant to interface with two or more financial processing systems, such as by ensuring that the transaction rules of each financial processing system are being implemented. Likewise, system 200 allows the payment gateway to implement transaction processing rules, so as to provide fraud detection, processing, or other suitable functions.

Figure 3:
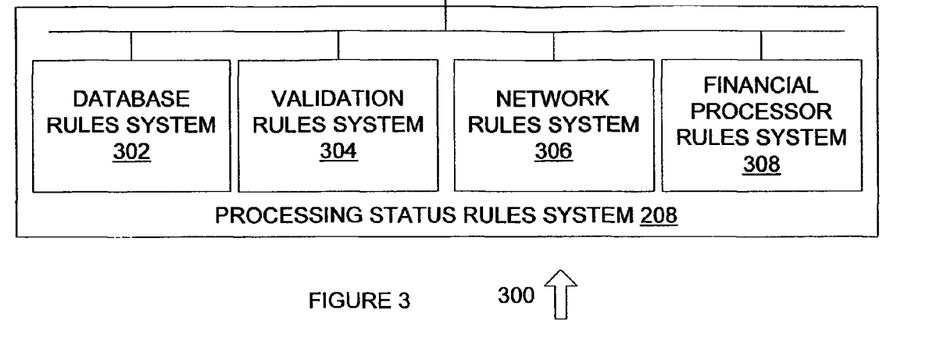
FIG. 3 is a diagram of a system for providing processing status rule functionality in accordance with an exemplary embodiment of the present invention.

FIG. 3 is a diagram of a system 300 for providing processing status rule functionality in accordance with an exemplary embodiment of the present invention. System 300 includes processing status rules system 208 and database rules system 302, validation rules system 304, network rules system 306, and financial processor rules system 308, each of which can be implemented in hardware, software, or a suitable combination of hardware and software, which can be one or more software systems operating on a general purpose processing platform.

Database rules system 302 receives transaction data and generates database rules error data. In one exemplary embodiment, database rules system 302 can determine whether a database error has occurred, such that transaction data processing should be stopped, retried, or whether other suitable functions should be performed. For example, the exemplary database rules shown in TABLE 8 can be implemented by database rules system 302.

TABLE 8

| DATABASE RULES | CODE |
| --- | --- |
| Database Open Error | C1 |
| Database Update Error | C2 |
| Database Close Error | C3 |
| Database Delete Error | C4 |
| Database Exception Error | C5 |
| Database Foreign Key Error | C6 |
| Database Wrong Number Records | C7 |

TABLE 8-continued

| DATABASE RULES | CODE |
| --- | --- |
| Error -Failed to Connect | C8 |
| Error -Failed to Connect - SA | C9 |

Based upon the action identified in the table, database rules system 302 can indicate database conditions affecting transaction processing or perform other suitable functions. For example, if a database is being updated when access is attempted, then "Code C2" would be returned. If a foreign key were submitted to the database, then "Code C6" would be generated. Depending on the type of function being performed, the data provided, and the rules of the specific financial processing system being utilized, either the transaction processing system or the financial processing system would implement the rule shown in TABLE 8. Furthermore, a suitable group of two or more rules can be defined as mandatory, such as to prevent unauthorized use of the data, for fraud protection, for quality control, or for other suitable purposes.

Validation rules system 304 receives transaction data and generates validation rules error data. In one exemplary embodiment, validation rules system 304 can determine whether a validation error has occurred, whether fraud indicators exist, or can perform other suitable functions. For example, the exemplary validation rules shown in TABLE 9 can be implemented by validation rules system 304.

TABLE 9

| VALIDATION RULE | CODE |
| --- | --- |
| ERR VALIDATION AGENTID | B0 |
| ERR VALIDATION AMOUNT | B1 |
| ERR VALIDATION AUTHACTION | B2 |
| ERR VALIDATION AVSADDRESS | B3 |
| ERR VALIDATION AVSZIPCODE | B4 |
| ERR VALIDATION BANKID | B5 |
| ERR VALIDATION BIN | B6 |
| ERR VALIDATION CASHBACKAMT | B7 |
| ERR VALIDATION CCCLIENTID | B8 |
| ERR VALIDATION CHAINID | B9 |
| ERR VALIDATION CUSTOMERDISCOUNT | B10 |
| ERR VALIDATION CUSTOMERADDR | B11 |
| ERR VALIDATION CUSTOMEREMAIL | B12 |
| ERR VALIDATION CUSTOMERID | B13 |
| ERR VALIDATION CUSTOMERNAME | B14 |
| ERR VALIDATION CUSTOMERORDREF | B15 |
| ERR VALIDATION CUSTOMERPASSWDHASH | B16 |
| ERR VALIDATION CUSTOMERPHONE | B17 |
| ERR VALIDATION CVV2 | B18 |
| ERR VALIDATION EXTTRANSREF | B19 |
| ERR VALIDATION GRATUITYAMT | B20 |
| ERR VALIDATION INSTTRANS | B21 |
| ERR VALIDATION ISSUENUM | B22 |
| ERR VALIDATION LANGUAGE | B23 |
| ERR VALIDATION MERCHANTGROUP | B24 |
| ERR VALIDATION MERCHANTID | B25 |
| ERR VALIDATION ORDERDESCRIPTION | B26 |
| ERR VALIDATION ORDERID | B27 |
| ERR VALIDATION RECORDTYPE | B28 |
| ERR VALIDATION RECURRING | B29 |
| ERR VALIDATION STOREID | B30 |
| ERR VALIDATION TAXAMT | B31 |
| ERR VALIDATION TAXINCLUDED | B32 |
| ERR VALIDATION TERMINALID | B33 |
| ERR VALIDATION TRANSDATE | B34 |
| ERR VALIDATION TRANSTIME | B35 |
| ERR VALIDATION ECOM | B36 |
| ERR VALIDATION SORTCODE | B37 |
| ERR VALIDATION ACNUMBER | B38 |
| ERR VALIDATION PAN LUHN | B39 |
| ERR VALIDATION PAN LENGTH | B40 |
| ERR VALIDATION PAN RANGE | B41 |

TABLE 9-continued

| VALIDATION RULE | CODE |
| --- | --- |
| ERR VALIDATION EXP DATE FORMAT | B42 |
| ERR VALIDATION EXP DATE TOO OLD | B43 |
| ERR VALIDATION EXP DATE TOO NEW | B44 |
| ERR VALIDATION START DATE FORMAT | B45 |
| ERR VALIDATION START DATE TOO NEW | B46 |
| ERR VALIDATION PAN FORMAT | B47 |
| ERR VALIDATION CURRENCY FORMAT | B48 |
| ERR VALIDATION CURRENCY UNSUPPORTED | B49 |
| ERR VALIDATION CURRENCY BAD EXPONENT | B50 |
| ERR VALIDATION MERCHANT UNSUPPORTED | B51 |
| ERR VALIDATION BRAND UNSUPPORTED | B52 |
| ERR VALIDATION BRAND PAN MISMATCH | B53 |

Based upon the action identified in the table, validation rules system 304 can determine whether an error has occurred based on data entry, either by internally checking the transaction data for compliance with financial processing system requirements or by submitting the transaction data to the appropriate financial processing system and subsequently mapping the response data to an appropriate error field, can accept a transaction, decline a transaction, request correction of data. or perform other suitable functions. For example, if a customer discount number were invalid for an authorization, then "Code B10" would be returned. If the terminal ID is invalid, then "Code B33 would be generated. Depending on the type of function being performed, the data provided, and the rules of the specific financial processing system being utilized, either the transaction processing system or the financial processing system would implement the rule shown in TABLE 9. Furthermore, a suitable group of two or more rules can be defined as mandatory, such as to prevent unauthorized use of the data, for fraud protection, for quality control, or for other suitable purposes.

Network rules system 306 receives transaction data and generates network rules error data. In one exemplary embodiment, network rules system 306 can determine whether a network error has occurred, such that transaction data processing should be stopped, retried, or whether other suitable functions should be performed. For example, the exemplary network rules shown in TABLE 10 can be implemented by network rules system 306.

TABLE 10

| NETWORK RULES | CODE |
| --- | --- |
| NW OPEN ERROR | D1 |
| NW TIMEOUT ERROR | D2 |
| NW READ ERROR | D3 |
| NW WRITE ERROR | D4 |
| NW SSL OPEN ERROR | D5 |
| NW SSL TIMEOUT ERROR | D6 |
| NW SSL READ ERROR | D7 |
| NW SSL WRITE ERROR | D8 |
| ERROR CAPTURE REV UPDATE | D9 |
| ERROR CAPTURE REV BATCH | D10 |
| ERROR CAPTURE GET PERCENTAGES | D11 |
| ERROR NOTHING TO CAPTURE REV | D12 |
| ERROR NOTHING TO CAPTURE | D13 |
| ERROR NOTHING TO AUTH | D14 |
| ERROR NOTHING TO AUTH REV | D15 |
| ERROR NOTHING TO CREDIT | D16 |
| ERROR NOTHING TO CREDIT REV | D17 |
| ERROR BATCH OPEN NOT SUPPORTED | D18 |
| ERROR BATCH CLOSE NOT SUPPORTED | D19 |
| ERROR AUTH STATUS | D20 |
| ERROR CAP STATUS | D21 |
| ERROR UNREVERSIBLE | D22 |
| ERROR BAD REVERSAL AMOUNT | D23 |

TABLE 10-continued

| NETWORK RULES | CODE |
|---|---|
| ERROR BAD REQUEST AMOUNT | D24 |
| ERROR ALREADY CAPTURED | D25 |
| ERROR INVALID ACTION | D26 |
| ERROR PROCESSING ACTION | D27 |
| ERROR MISSING TRANSACTION REFERENCE INDEX | D28 |
| ERROR REQUEST NOT ALLOWED | 029 |
| ERROR SPLIT AUTH NOT ALLOWED ALREADY MARKED | D30 |
| ERROR AUTH CREDIT OUT OF RANGE | D31 |
| ERROR REQUEST INVALID | D32 |
| UNKNOWN PROTOCOL | D33 |
| Message Formatting Errors | |
| MANDATORY FIELDS ERROR | E0 |
| Converter Errors | |
| FE NETWORK ERROR | E1 |
| FE INTERRUPTED SESSION | E2 |
| FE BAD RESONSE | E3 |
| FE INCOMPLETE RESPONSE | E4 |
| Data Validation Errors | |
| EXPIRY DATE ERROR | F0 |
| ERROR BADMERCHANT | F1 |
| ERROR CANTSETPORT | F2 |
| ERROR CANTSETALLOWNONSSL | F3 |
| SPAY Errors | |
| SPAY TABLE ERROR | G0 |
| ADDKEYSET SET ERROR | G1 |
| INIT PURCHASE ERROR | G2 |
| BAD MERCHBRAND ERROR | G3 |
| NO PCERT ERROR | G4 |
| NO KEYSET ERROR | G5 |
| NOT CURRENT KEYSET ERROR | G6 |
| MISSING CERT ERROR | G7 |
| Transaction Errors | |
| NO ROUTE ERROR | H0 |

Based upon the action identified in the table, network rules system 306 can determine whether a network-related error has occurred, either by internally checking the transaction data for compliance with requirements, by submitting the transaction data to the appropriate financial processing system and subsequently mapping the response data to an appropriate error field, or by performing other suitable functions. For example, if the authorization credit is out of range, then "Code D31" would be returned. If an invalid expiration date were provided, then "Code F0" would be generated. Depending on the type of function being performed, the data provided, and the rules of the specific financial processing system being utilized, either the transaction processing system or the financial processing system would implement the rule shown in TABLE 10. Furthermore, a suitable group of two or more rules can be defined as mandatory, such as to prevent unauthorized use of the data, for fraud protection, for quality control, or for other suitable purposes.

Financial processor rules system 308 receives transaction data and generates financial processor rules error data. In one exemplary embodiment, financial processor rules system 308 can determine whether financial processor rules have been violated, such that transaction data should be corrected or whether other suitable functions should be performed. For example, the exemplary financial processor rules shown in TABLE 11 can be implemented by financial processor rules system 308.

TABLE 11

| VENDOR PURCHASING VALIDATION RULES | CODE |
|---|---|
| VP VALIDATION ERROR NO DATA | B54 |
| VP VALIDATION ERROR COMMODITY CODE | B55 |
| VP VALIDATION ERROR UNIT COST | B56 |
| VP VALIDATION ERROR UNIT OF MEASURE | B57 |
| VP VALIDATION ERROR DESCRIPTOR | B58 |
| VP VALIDATION ERROR QUANTITY | B59 |
| VP VALIDATION ERROR VATRATE | B60 |
| VP VALIDATION ERROR CALCULATED LINEITEM | B61 |
| VP VALIDATION ERROR NO LINE ITEMS | B62 |
| VP VALIDATION ERROR CUSTREF | B63 |
| VP VALIDATION ERROR TAXINCLUDED | B64 |
| VP VALIDATION ERROR TAX | B65 |
| VP VALIDATION ERROR PID | B66 |
| VP VALIDATION ERROR CALCULATED TOTAL | B67 |
| VP VALIDATION ERROR CALCULATED TAX AMT | B68 |
| VP VALIDATION ERROR ITEMTOTAL | B69 |
| UNKNOWN ERROR TYPE | B70 |
| GATEWAY SYSTEM ERROR CONDITIONS | B71 |

Based upon the action identified in the table, financial processor rules system 308 can determine whether a financial processor rules error has occurred, either by internally checking the transaction data for compliance with financial processor rules, by submitting the transaction data to the appropriate financial processing system and subsequently mapping the response data to an appropriate error field, or by performing other suitable functions. For example, if there is a validation error regarding the unit cost, then "Code B56" would be returned. If the quantity exceeds predetermined bounds or data types, then "Code B59" would be generated. Depending on the type of function being performed, the data provided, and the rules of the specific financial processing system being utilized, either the transaction processing system or the financial processing system would implement the rule shown in TABLE 11. Furthermore, a suitable group of two or more rules can be defined as mandatory, such as to prevent unauthorized use of the data, for fraud protection, for quality control, or for other suitable purposes.

In operation, system 300 performs processing status rule processing of financial transaction data. System 300 is used to enforce processing status rules, such as rules relating to validation, specific financial processors, or other suitable rules. In this manner, system 300 allows a centralized processor to coordinate financial transaction processing for plurality of financial processing systems and merchants.

Figure 4:
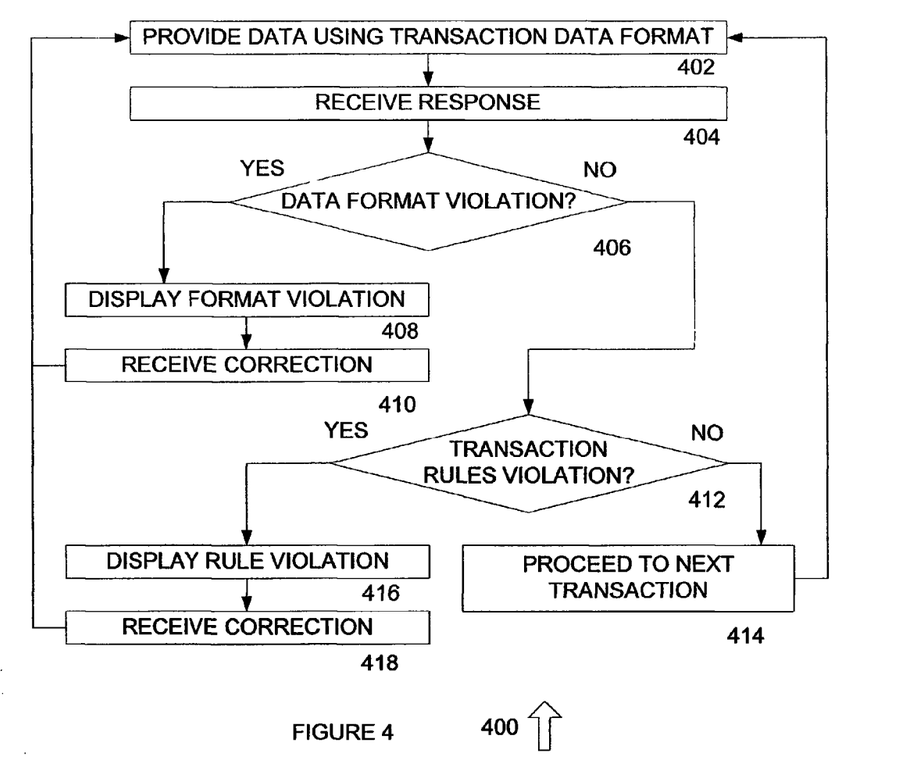
FIG. 4 is a flow chart of a method for performing transaction processing in accordance with an exemplary embodiment of the present invention.

FIG. 4 is a flow chart of a method 400 for performing transaction processing in accordance with an exemplary embodiment of the present invention. Method 400 begins at 402 where transaction data is provided using a transaction data format. In one exemplary embodiment, the transaction data format can be provided in the form of one or more web pages of data from a payment gateway system. Likewise, each merchant may have transaction data processing systems that provide the transaction data using the transaction data format specified by the payment gateway. The types of transaction data requested can be selected based on the processing rule that is being implemented. Other suitable processes can be used. The method then proceeds to 404.

At 404 a response is received to the transaction data. In one exemplary embodiment, the response can be received in real time, in batch mode, in the form of a document, or in other suitable processes. The method then proceeds to 406.

At 406 it is determined whether a data format violation has been identified. In one exemplary embodiment, a data format violation can include providing a data field in excess of the maximum data field size, providing alphanumeric data in a data field that should only receive numeric data, or other data format violations. If it is determined that a data format violation has not occurred at 406, the method proceeds to 412. Otherwise the method proceeds to 408 where the format violation is displayed. In one exemplary embodiment, the format violation can be displayed by receiving format violation description data, and can include the data format error or other suitable data to explain to a user what the error was and how to correct it. The method then proceeds to 410.

At 410, correction data is received. In one exemplary embodiment, the correction data can be received by prompting the user to enter only the defective field, by allowing the user to correct multiple fields that relate to the defective field, or in other suitable manners. The method then returns to 402.

At 412, it is determined whether a transaction rules violation has occurred. In one exemplary embodiment, a transaction rules violation can occur when the value of the data entered meets the data format requirements but is otherwise not permitted. Likewise, other transaction rules violations can occur, such as entry of a first data field type without entry of corresponding data fields, entry of dates before or after permitted date periods, or in other rules violations. If it is determined at 412 that a transaction rules violation has not occurred the method proceeds to 414 where the next transaction is processed. The method then returns to 402. Likewise, if it is determined that a transaction rules violation has occurred the method proceeds to 416 where the rule violation is displayed. In one exemplary embodiment, notification data can be generated to a user that identifies the rule violation, displays the data that has caused the violation, or other suitable data can be provided. The method then proceeds to 418 where correction data is received. In one exemplary embodiment, the correction data can include one or more fields in addition to the defective field, or other suitable corrective data. The method then returns to 402.

In operation, method 400 allows transaction data to be processed by a centralized payment gateway or transaction processor, such that a merchant can accept payment types for two or more different payment processors, and does not need to determine whether the data complies with data formats and rules specified by the financial transaction processors, and also does not need to track the status of the transaction after it has been accepted. Method 400 allows the data format and rules to be verified before the data is transmitted to a financial processor, so as to minimize the probability that the transaction will be rejected, to increase the speed at which a merchant gets paid, decrease the number of errors experienced by the merchant that can cause delay or failure of the payment, and to avoid other problems.

Figure 5:
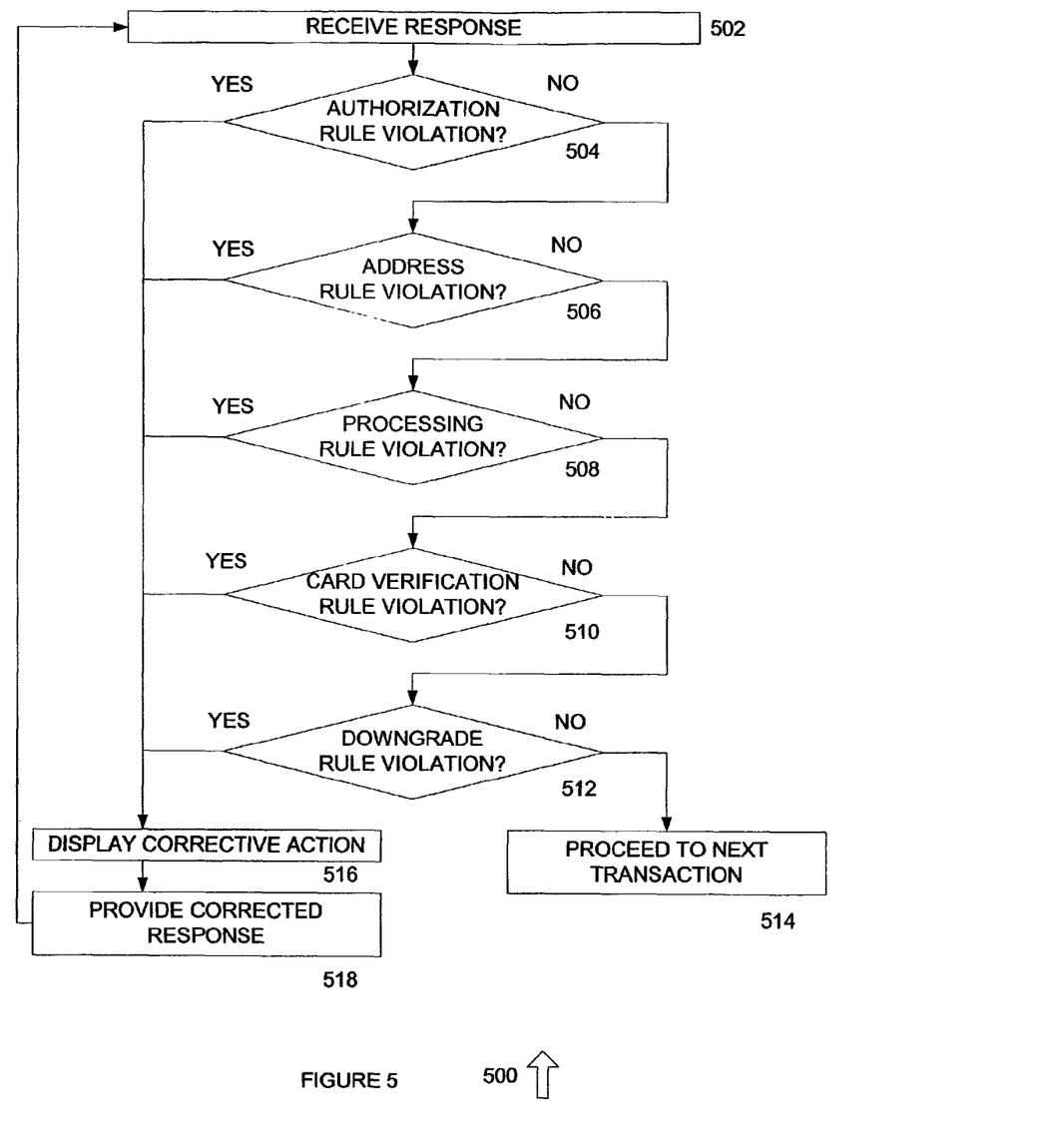
FIG. 5 is a flow chart of a method for performing transaction rule violation processing in accordance with an exemplary embodiment of the present invention.

FIG. 5 is a flow chart of a method 500 for performing transaction rule violation processing in accordance with an exemplary embodiment of the present invention. Method 500 begins at 502 where response data is received after submission of transaction data. The method then proceeds to 504.

At 504 it is determined whether an authorization rule violation has occurred. In one exemplary embodiment, an authorization rule violation can include an invalid merchant number, an invalid value in a message, an invalid authorization amount, an unsupported requested function, or other violations. Likewise, an authorization rule result can be an indication that the transaction has been approved, declined, or that other suitable procedures should be implemented. If it is determined that an authorization rule violation has been received the method proceeds to 516, otherwise the method proceeds to 506.

At 506 it is determined whether an address rule violation has occurred. In one exemplary embodiment, the address rule violation can include submitting a transaction for address verification that is not authorized or is ineligible for address verification, receiving an indication that a zip code is invalid or does not match the account, or other suitable address violations. If an address rule violation has occurred the method proceeds to 516, otherwise the method proceeds to 508.

At 508 it is determined whether a processing rule violation has occurred. In one exemplary embodiment, processing rule violations can include state errors, such as requesting cancellation of a charge before a charge has been submitted, submission of a response after the same response has been submitted, or other processing rule violations. If it is determined that a processing rule violation has occurred the method proceeds to 516, otherwise the method proceeds to 510.

At 510 it is determined whether a card verification rule violation has occurred. In one exemplary embodiment, the card verification rules can include an indication that a card not present transaction is not allowed for the user or card, that the card is unsupported by an issuer, or other suitable card verification data. If it is determined that a card verification rule violation has occurred the method proceeds to 516, otherwise the method proceeds to 512.

At 512 it is determined whether a downgrade rule violation has occurred. In one exemplary embodiment, a downgrade rule can include a processor-specific downgrade rule such as address verification not requested, invalid purchase identified, or transaction identifier being invalid. If it is determined that a downgrade rule violation has occurred the method proceeds to 516, otherwise the method proceeds to 514 and the next transaction is processed.

At 516 the corrective action is displayed. In one exemplary embodiment, the corrective action can include a narrative describing the field in which the error was noted, displaying the error field, displaying a template of a correct entry field, and other suitable corrective actions. The method then proceeds to 518.

At 518 corrected response data is provided. In one exemplary embodiment, a user interface can be generated that provides an entry field for providing the corrected response with additional data, such as data identifying responses permitted under the rule, data formats permitted, or other suitable data. The method then returns to 502.

In operation, method 500 allows transaction data to be confirmed for compliance with one or more processing rules. Method 500 allows a user to immediately correct any data rule violations, such that processing delays caused by entry of non-complying data can be eliminated. Likewise, method 500 provides a uniform interface for users that allows users to interface with multiple financial processing systems without detailed knowledge of the rules of each financial processing system. Although the processes are shown occurring serially with correction after each detected mistake, one of ordinary skill in the art will recognize that the processes can be performed in parallel, that error flags can be used such that all errors are corrected at one time, or that other suitable processes can be used.

Although preferred and exemplary embodiments of a system and apparatus for credit transaction data transmission have been described in detail herein, those skilled in the art will also recognize that various substitutions and modifications can be made to the systems and methods without departing from the scope and spirit of the appended claims.

What is claimed is:

1. A system for processing transaction data for two or more financial processing systems comprising:
   a processor;
   a financial transaction data format system receiving financial transaction data from a merchant system, the financial transaction data including a plurality), of data fields, each data field having a different transaction data formats as set forth in Table 1, and generating financial transaction data format error data if any of the data fields does not comply with the associated transaction data format for that field; and
   a financial transaction data rules system receiving the financial transaction data and generating financial transaction rule error data by applying a plurality of rules as set forth in Tables 2 through 10, wherein the financial transaction data rules utilize the plurality of data fields to determine whether one of the plurality of rules has been violated.

2. The system of claim 1 wherein the financial transaction data format system further comprises an extensible markup language data type definition that defines allowable transaction data fields, and the transaction data format system determines whether the transaction data complies with the data type definition.

3. The system of claim 1 wherein the financial transaction data rules system further comprise an authorization response rules system receiving the financial transaction data including a merchant number and generating authorization response rule error data that instructs a user to fix an invalid merchant number.

4. The system of claim 1 wherein the financial transaction data rules system further comprises an address verification rules system receiving the financial transaction data including an issuer identification and generating address verification rule error data that identifies that an issuer associated with the issuer identification does not participate in address verification.

5. The system of claim 1 wherein the financial transaction data rules system further comprises a card verification value rules system receiving the financial transaction data including an issuer identification and generating card verification value rule error data that identifies that an issuer associated with the issuer identification does not support card verification value.

6. The system of claim 1 wherein the financial transaction data rules system further comprises a processing status rules system receiving the financial transaction data including capture amount data and generating processing status rule error data that identifies that the capture amount data is invalid.

7. The system of claim 1 wherein the financial transaction data rules system further comprises a downgrade rules system receiving the financial transaction data including purchase identifier data and generating downgrade rule error data that identifies that the purchase identifier data is invalid.

8. The system of claim 1 further comprising an error display system receiving the financial transaction data format error data or the financial transaction rule error data and generating notification data containing the financial transaction data format error data or the financial transaction rule error data.

9. The system of claim 1 further comprising a corrective action system receiving financial transaction data format correction data or financial transaction rule correction data and providing the financial transaction data format correction data or financial transaction rule correction data to the financial transaction data format system or the transaction rules system.

10. A method for processing transaction data comprising: receiving the transaction data at a payment processing system; generating data format error data if the transaction data does not comply with a data format, wherein the data format comprises each of the data formats defined in TABLE 1: and generating transaction rules error data if the transaction data does not comply with a transaction rule.

11. The method of claim 10 wherein generating the data format error data comprises displaying format violation data.

12. The method of claim 10 wherein generating the transaction rules error data comprises displaying transaction rule violation data.

13. The method of claim 10 further comprising transmitting the transaction data to a financial processing system if data format error data or transaction rules error data has not been transmitted.

14. The method of claim 10 further comprising: receiving corrected transaction data; and transmitting the corrected transaction data to a financial processing system.

15. The method of claim 10 wherein the transaction rule comprises one or more of the group comprising the rules defined in TABLES 2 through 11.

* * * * *

UNITED STATES PATENT AND TRADEMARK OFFICE
CERTIFICATE OF CORRECTION

PATENT NO.         : 8,762,236 B1
APPLICATION NO.    : 10/196586
DATED              : June 24, 2014
INVENTOR(S)        : John Earl Shirey, James Harrison Bullard and Joseph Stumpf Dollard It is certified that error appears in the above-identified patent and that said Letters Patent is hereby corrected as shown below:

In the Claims:

Column 23, line 7, delete "),"

Signed and Sealed this
Second Day of September, 2014

Michelle K. Lee
*Deputy Director of the United States Patent and Trademark Office*